(12) United States Patent
Narabu

(10) Patent No.: US 8,264,590 B2
(45) Date of Patent: *Sep. 11, 2012

(54) IMAGING APPARATUS AND METHOD

(75) Inventor: Tadakuni Narabu, Kanagawa (JP)

(73) Assignee: Sony Corporation, Tokyo (JP)

( * ) Notice: Subject to any disclaimer, the term of this patent is extended or adjusted under 35 U.S.C. 154(b) by 81 days.

This patent is subject to a terminal disclaimer.

(21) Appl. No.: 12/781,061

(22) Filed: May 17, 2010

(65) Prior Publication Data

US 2010/0220218 A1    Sep. 2, 2010

Related U.S. Application Data

(63) Continuation of application No. 11/626,950, filed on Jan. 25, 2007, which is a continuation-in-part of application No. 11/208,377, filed on Aug. 19, 2005, now Pat. No. 7,639,293.

(30) Foreign Application Priority Data

Aug. 20, 2004   (JP) ................................ 2004-240605
Aug. 18, 2005   (JP) ................................ 2005-237139

(51) Int. Cl.
*H04N 5/225*    (2006.01)
*G02B 13/16*    (2006.01)

(52) U.S. Cl. .......................... 348/340; 348/373; 348/335

(58) Field of Classification Search .............. 348/207.99, 348/201, 275, 290, 373, 340, 335; 356/342, 356/493, 485, 496, 498
See application file for complete search history.

(56) References Cited

U.S. PATENT DOCUMENTS

| | | | |
|---|---|---|---|
| 2,043,292 A | 6/1936 | Hillman | |
| 3,791,275 A | 2/1974 | Bryngdahl | |
| 4,302,089 A | 11/1981 | Fukuhara | |
| 4,680,466 A | 7/1987 | Kuwahara et al. | |
| 5,450,240 A | 9/1995 | Hall et al. | |
| 5,453,784 A | 9/1995 | Krishnan et al. | |
| 5,847,398 A | 12/1998 | Shahar et al. | |
| 6,312,373 B1 * | 11/2001 | Ichihara | 356/515 |
| 7,141,798 B2 | 11/2006 | Ito et al. | |
| 7,157,690 B2 | 1/2007 | Nishiwaki et al. | |
| 7,196,728 B2 | 3/2007 | Campbell et al. | |
| 7,336,422 B2 * | 2/2008 | Dunn et al. | 359/626 |
| 7,639,293 B2 * | 12/2009 | Narabu | 348/263 |
| 2003/0063783 A1 * | 4/2003 | Higuchi | 382/125 |
| 2003/0142410 A1 * | 7/2003 | Miyake | 359/619 |
| 2004/0174433 A1 | 9/2004 | Uchino | |
| 2004/0238731 A1 | 12/2004 | Nishiyama et al. | |
| 2005/0046944 A1 * | 3/2005 | Shenderova et al. | 359/565 |
| 2006/0001967 A1 * | 1/2006 | Techakumpuch et al. | 359/464 |
| 2007/0177040 A1 * | 8/2007 | Narabu | 348/294 |

OTHER PUBLICATIONS

Georgeiv and Intwala; Light Field Camera Design for Integral View Photography; 2003.

* cited by examiner

*Primary Examiner* — Lin Ye
*Assistant Examiner* — Euel Cowan
(74) *Attorney, Agent, or Firm* — SNR Denton US LLP

(57) ABSTRACT

An imaging apparatus includes an imaging device, a light guide mechanism, and a signal processing unit. The imaging device converts light incident on a photoelectric conversion portion of the imaging device into electric signals. The light guide mechanism, arranged adjacent to the photoelectric conversion portion of the imaging device, includes a plurality of apertures that guide light from a subject to the photoelectric conversion portion of the imaging device. The signal processing unit performs desired signal processing on the electric signals output from the imaging device on the basis of subject information units derived from the light guided onto the photoelectric conversion portion of the imaging device through the apertures.

14 Claims, 20 Drawing Sheets

FOUR APERTURES

TWO APERTURES

TWELVE APERTURES

MIDDLE SIZED APERTURES

LARGE APERTURES

SMALL APERTURES

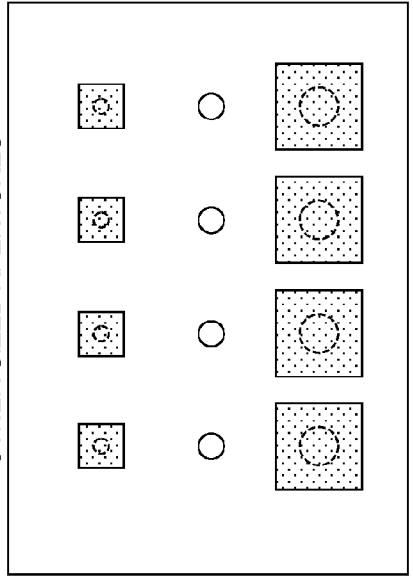
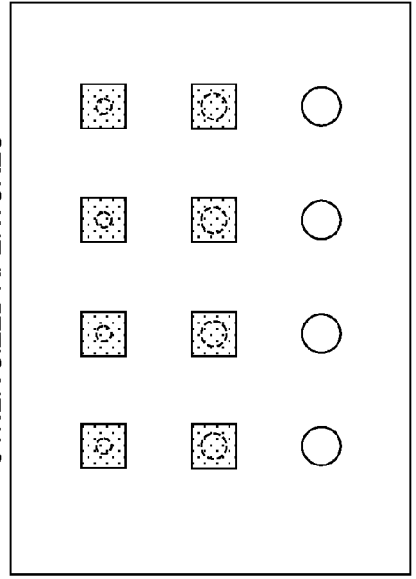
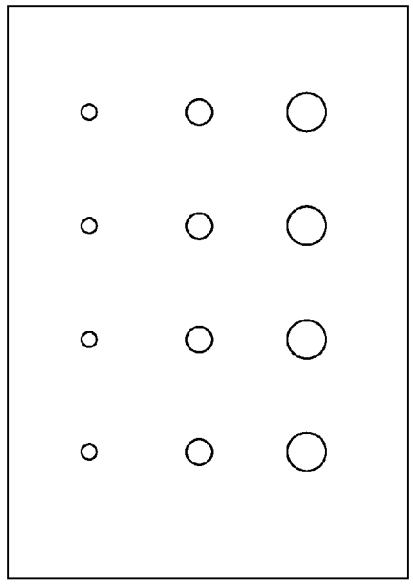
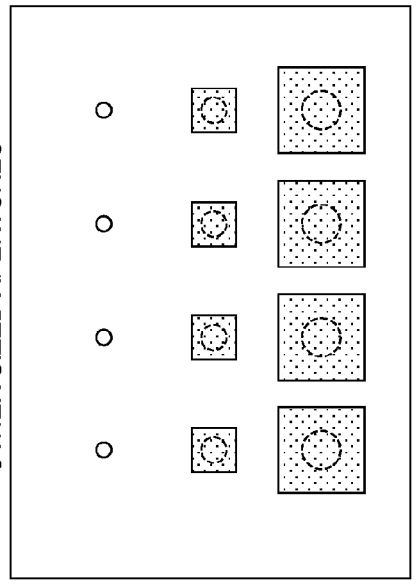

APERTURES HAVING MAXIMUM TRANSMITTANCE

APERTURES HAVING MINIMUM TRANSMITTANCE

APERTURES HAVING MEDIUM TRANSMITTANCE

APERTURES OF DIFFERENT TRANSMITTANCES

APERTURES HAVING SPECTRAL TRANSMISSION
CHARACTERISTICS IN RED WAVELENGTH RANGE

APERTURES HAVING SPECTRAL TRANSMISSION
CHARACTERISTICS IN BLUE WAVELENGTH RANGE

APERTURES HAVING SPECTRAL TRANSMISSION
CHARACTERISTICS IN FULL WAVELENGTH RANGE

APERTURES HAVING SPECTRAL TRANSMISSION
CHARACTERISTICS IN GREEN WAVELENGTH RANGE

APERTURES EACH HAVING LENS

COMBINATION OF APERTURE HAVING LENS AND APERTURES HAVING NO LENS

FIG. 18
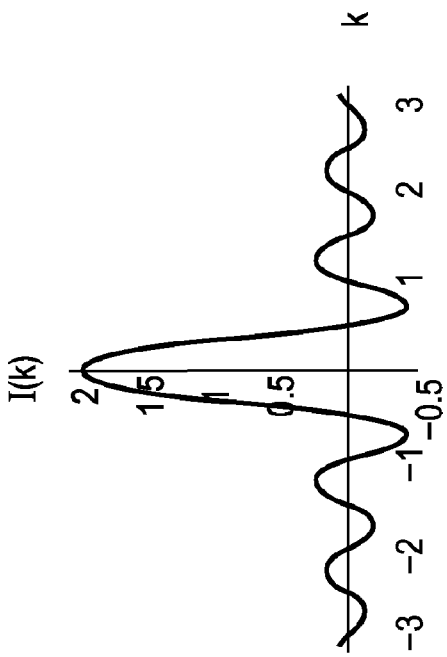
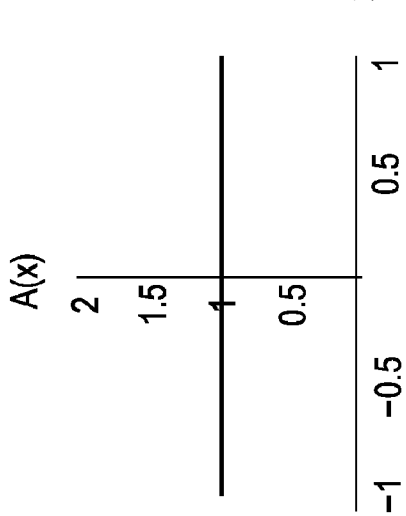
APODIZATION FUNCTION: UNIFORM
INSTRUMENT FUNCTION: $I = 2a \cdot \text{sinc}(2\pi ka)$ FIG. 19
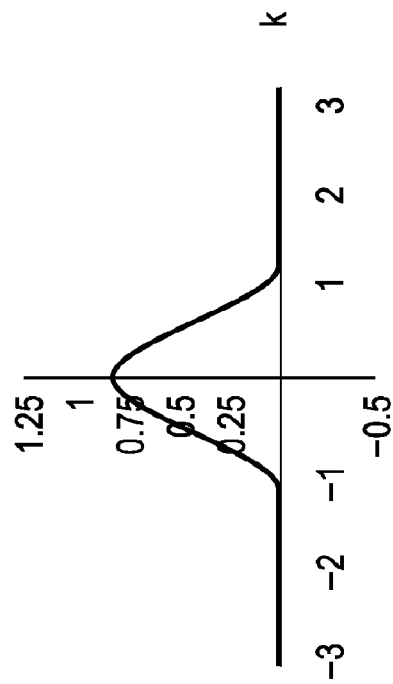
INSTRUMENT FUNCTION
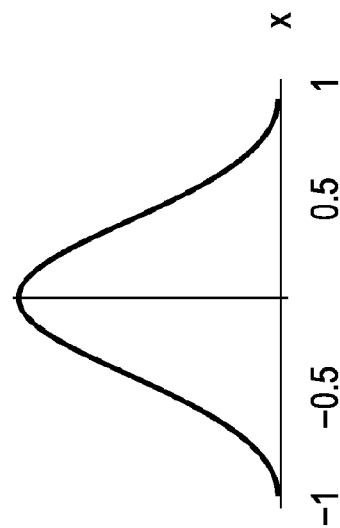
APODIZATION FUNCTION: BLACKMAN FIG. 20
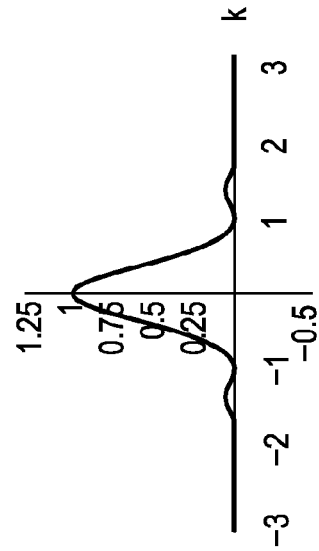
$I(k) = a\,\mathrm{sinc}^2(\pi k a)$
INSTRUMENT FUNCTION
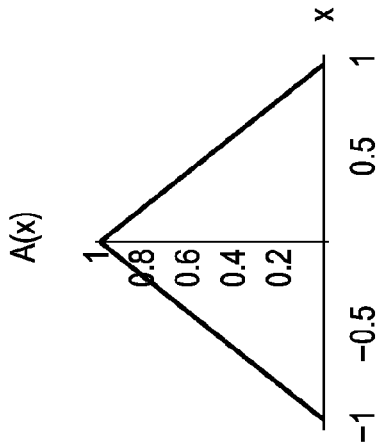
$A(x) = 1 - \dfrac{|x|}{a}$
APODIZATION FUNCTION: BARTLETT

FIG. 21

| TYPE | APODIZATION FUNCTION | INSTRUMENT FUNCTION |
|---|---|---|
| BARTLETT | $1 - \frac{|x|}{a}$ | $a\,\text{sinc}^2(\pi k a)$ |
| BLACKMAN | $B_A(x)$ | $B_I(k)$ |
| CONNES | $\left(1 - \frac{x^2}{a^2}\right)^2$ | $8a\sqrt{2\pi}\,\frac{I_{x/2}(2\pi k a)}{(2\pi k a)^{x/2}}$ |
| COSINE | $\cos\left(\frac{\pi x}{2a}\right)$ | $\frac{4a\cos(2\pi a k)}{\pi(1 - 10a^2 k^2)}$ |
| GAUSSIAN | $e^{-x^2/(2a^2)}$ | $2\int_0^a \cos(2\pi k x)e^{-x^2/(2a^2)}dx$ |
| HAMMING | $Hm_A(x)$ | $Hm_I(k)$ |
| HANNING | $Hn_A(x)$ | $Hn_I(k)$ |
| UNIFORM | 1 | $2a\,\text{sinc}(2\pi k a)$ |
| WELCH | $1 - \frac{x^2}{a^2}$ | $W_I(k)$ |

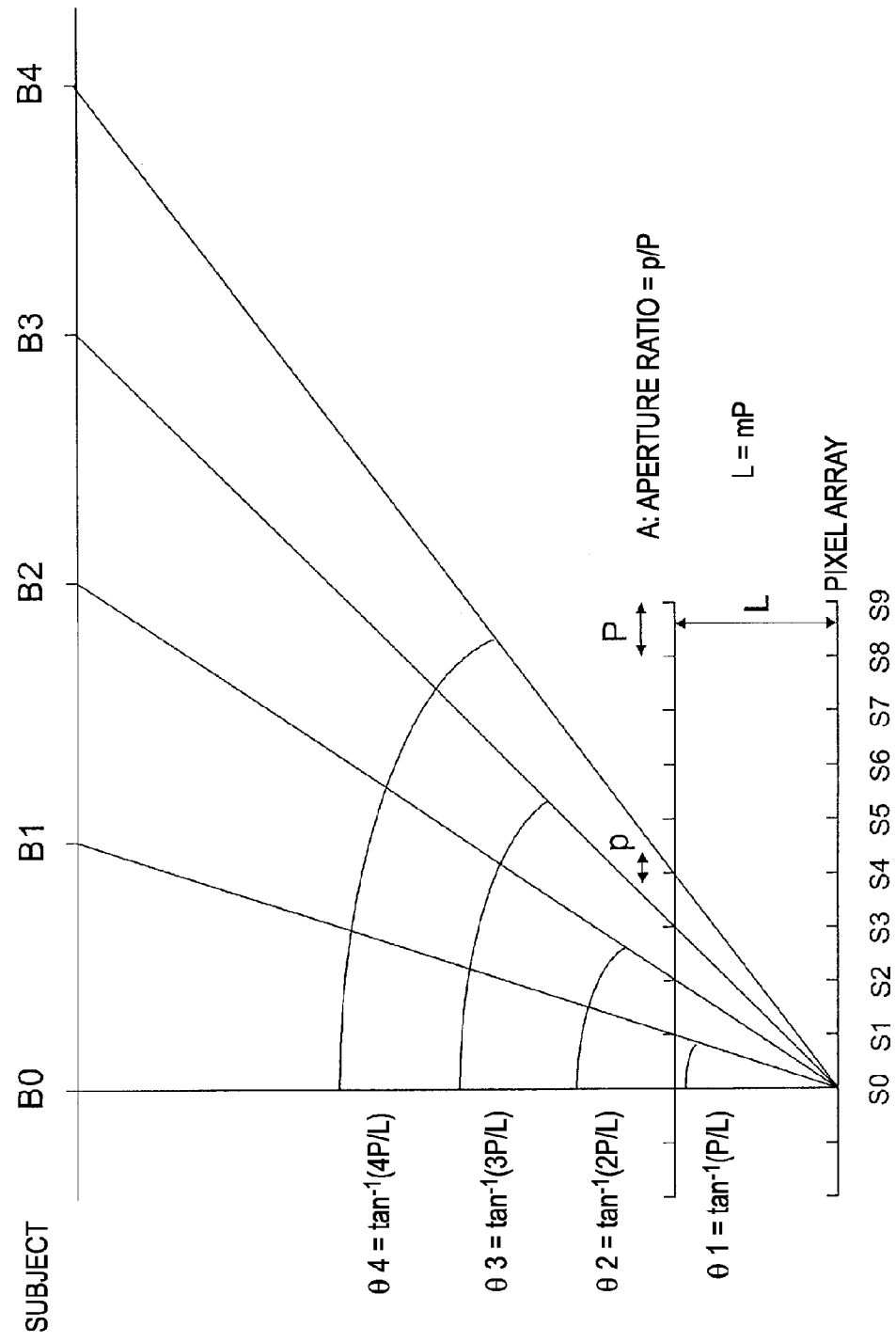

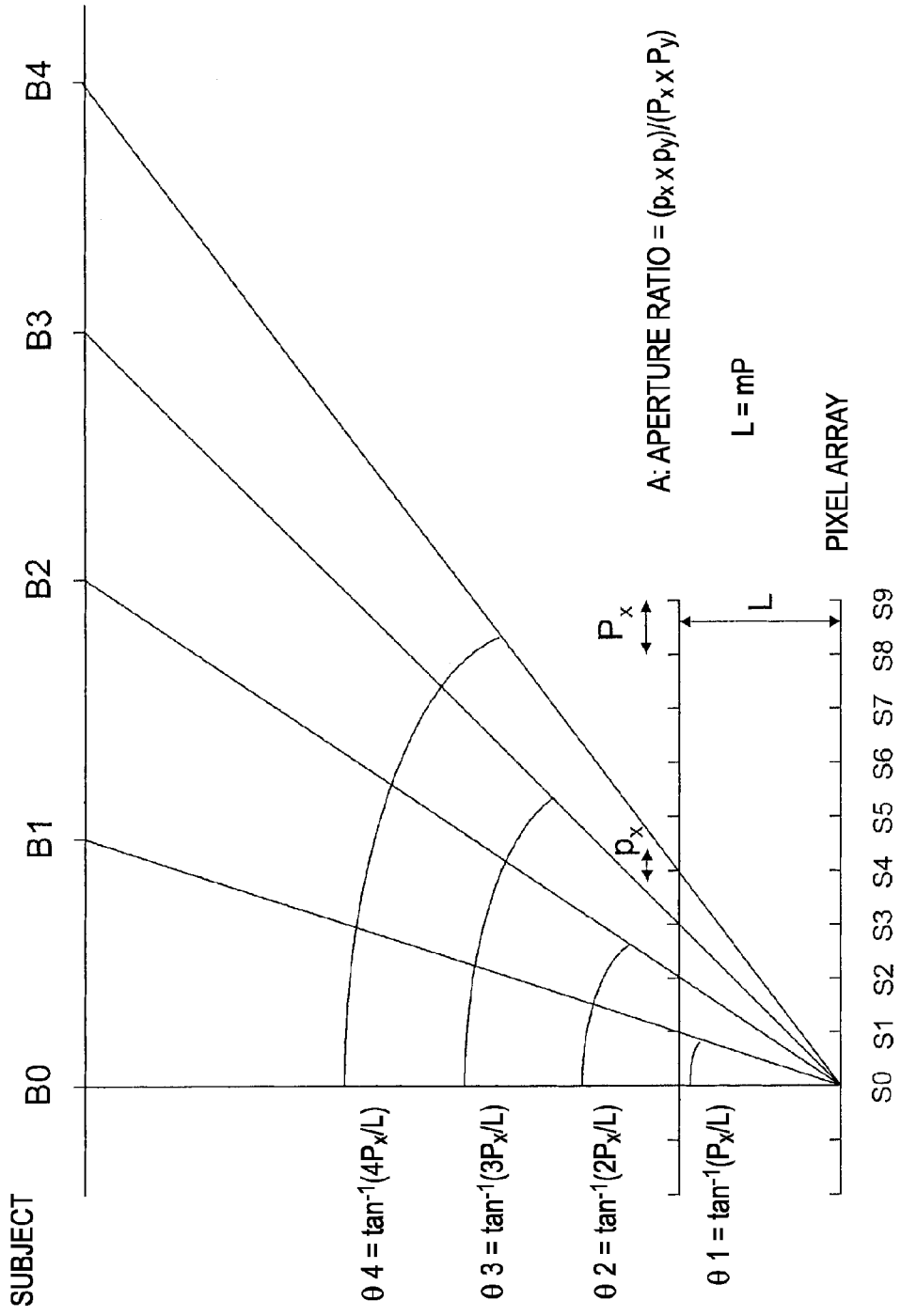

IMAGING APPARATUS AND METHOD

This application is a continuation of U.S. patent application Ser. No. 11/626,950, filed Jan. 25, 2007, which is a continuation-in-part of U.S. patent application Ser. No. 11/208,377, filed Aug. 19, 2005, the entireties of which are incorporated herein by reference to the extent permitted by law. The present application claims priority to Japanese patent application No. JP 2004-240605 filed in the Japanese Patent Office on Aug. 20, 2004 and Japanese Patent Application No. JP 2005-237139 filed in the Japanese Patent Office on Aug. 18, 2005, the entire contents both of which are incorporated by reference herein to the extent permitted by law.

BACKGROUND OF THE INVENTION

The present invention relates to imaging apparatuses and methods, and in particular, to an imaging apparatus using an imaging device that converts light from a subject into electric signals and a method of imaging thereof.

As an imaging apparatus, a pinhole camera is well-known. In the pinhole camera, light reflected from a subject is guided onto a photosensitive material, such as a film, in a dark box through a hole, called a pinhole, formed on one surface of the dark box, thus imaging the subject. In the pinhole camera, slight light passing through the pinhole reaches one point on the photosensitive material. Therefore, the amount of light is small. In imaging under low light conditions, particularly, in dark places, the pinhole camera is of little practical use.

A generally known imaging apparatus is disclosed by Takemura Hiroo, "CCD Kamera Gijutsu Nyumon [Introduction to CCD Camera Technology]", first edition, Corona Publishing Co., Ltd., August 1998, pp. 2-4. The imaging apparatus includes an imaging lens 101 as shown in FIG. 24. The apparatus has a structure in which an imaging device 102 is arranged in the focal position of the imaging lens 101, light from a subject captured by the imaging lens 101 is subjected to optical processing through an optical system 103 so that the imaging device 102 easily converts the light into electric signals, the resultant light is guided onto a photoelectric conversion portion of the imaging device 102 so that the light is converted into electric signals, and electric signals obtained through the imaging device 102 are subjected to predetermined signal processing by a signal processing circuit 104 arranged downstream of the imaging device 102.

This type of imaging apparatus is used solely as a camera system, e.g., a digital still camera. Furthermore, the imaging apparatus can be incorporated into a compact portable device, such as a mobile phone. Actually, reducing the size, weight, and cost of the imaging apparatus is strongly desired in incorporating the apparatus into a mobile phone. In other words, the use of a small-sized, lightweight, and low-cost imaging apparatus extremely contributes to the reduced size, weight, and cost of a compact portable device, such as a mobile phone.

SUMMARY OF THE INVENTION

Since the imaging apparatus uses the imaging lens 101, the size of the apparatus is increased by an amount corresponding to the size of the imaging lens 101, the weight thereof is increased by an amount corresponding to the weight of the imaging lens 101, and further, the cost thereof is increased by an amount corresponding to the cost of the imaging lens 101. In addition, the amount of ambient light is reduced due to shading of the imaging lens 101. In shooting a subject with a wide dynamic range, the difference in signal charge among pixels of the imaging device 102 is large. Therefore, it is necessary to design the imaging device 102 so as to provide a wide dynamic range.

The present invention is made in consideration of the above problems. It is desirable to provide an imaging apparatus which needs no imaging lens to achieve a reduction in size, weight, and cost of the apparatus and allows for imaging without blurring with the desired amount of light, and a method of imaging thereof.

According to an embodiment of the present invention, there is provided an imaging apparatus including an imaging device, a light guide mechanism, and a signal processing unit. The imaging device converts light incident on a photoelectric conversion portion of the imaging device into electric signals. The light guide mechanism, arranged adjacent to the photoelectric conversion portion of the imaging device, includes a plurality of apertures that guide light from a subject to the photoelectric conversion portion of the imaging device. The signal processing unit performs desired signal processing on the electric signals output from the imaging device on the basis of subject information units derived from the light guided onto the photoelectric conversion portion of the imaging device through the apertures.

With the above-described structure, the light from the subject is guided to the photoelectric conversion portion of the imaging device through the respective apertures, thus forming subject images corresponding to the apertures on the photoelectric conversion portion. As for energy of light incident on the photoelectric conversion portion of the imaging device, energy corresponding to the number of formed subject images, i.e., energy corresponding to the number of apertures is obtained. Therefore, the necessary amount of light can be obtained by appropriately setting the number of apertures. However, the subject images are formed on the photoelectric conversion portion of the imaging device such that the subject images are shifted relative to one another by the amount of shift corresponding to the pitch of the apertures. The shifts among the subject images are corrected by the signal processing unit arranged downstream of the imaging device. Thus, a blur-free image can be captured with the desired amount of light.

Advantageously, the imaging apparatus according to the embodiment of the present invention can capture a blur-free image of a subject with the desired amount of light using no imaging lens. Thus, a reduction in size, weight, and cost of the imaging apparatus can be achieved. The apparatus includes no imaging lens. Accordingly, in shooting a subject with a wide dynamic range, the dynamic range of the imaging device can be effectively used because the difference in signal charge among pixels of the imaging device is small.

BRIEF DESCRIPTION OF THE DRAWINGS

FIGS. 14A to 14D are diagrams explaining apertures of different sizes in various patterns of use;

FIG. 18 shows an example of the transmittance distribution of an aperture;

FIG. 19 shows an example of the transmittance distribution of an aperture;

FIG. 20 shows an example of the transmittance distribution of an aperture;

FIG. 21 shows examples of transmittance distribution functions;

FIG. 22 is a diagram showing the relationship between a subject and the imaging apparatus using a one-dimensional model;

FIG. 23 is a diagram illustrating the relationship between the subject and the imaging apparatus using a two-dimensional model.

DESCRIPTION OF THE PREFERRED EMBODIMENTS

An embodiment of the present invention will now be described in detail below with reference to the drawings.

Figure 1:
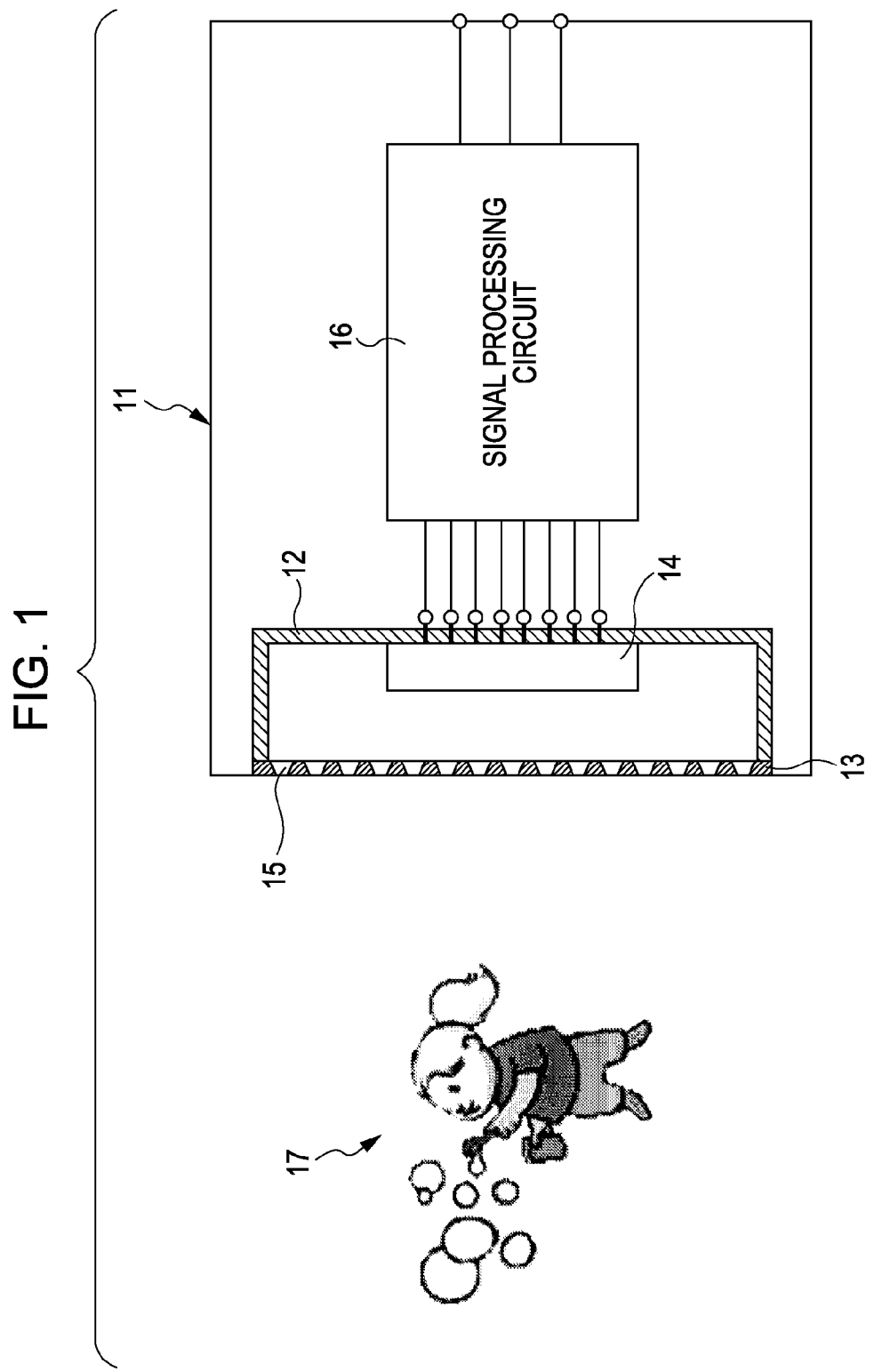
FIG. 1 is a schematic diagram illustrating the fundamental structure of an imaging apparatus according to an embodiment of the present invention.

FIG. 1 is a schematic diagram illustrating the fundamental structure of an imaging apparatus according to an embodiment of the present invention. Referring to FIG. 1, an apparatus body 11 has an opening at one principal plane thereof. A package 12 having, for example, a rectangular shape is arranged at the opening. The package 12 has an opening at one principal plane thereof such that the opening is adjacent to the opening of the body 11. A light shielding plate 13 is arranged at the opening of the package 12, thus forming a dark box.

An imaging device 14 is arranged in the package 12. The imaging device 14 includes a solid imaging device, e.g., a charge-transfer imaging device, such as a charge coupled device (CCD) imager, or an XY-addressable imaging device, such as a metal oxide semiconductor (MOS) imager. The solid imaging device converts incoming light into an electric signal based on the amount of light every pixel.

In the present embodiment, for example, the light shielding plate 13 includes, for example, a flat plate. The light shielding plate 13 has a plurality of apertures 15 whose number is the same as that of pixels of the imaging device 14. The apertures 15, called pinholes, each have a very small diameter.

The light shielding plate 13 and the apertures 15 arranged in the light shielding plate 13 constitute an aperture sheet that functions as a light guide mechanism that guides light from a subject 17 to a photoelectric conversion section of the imaging device 14. Accordingly, light beams from the subject 17 pass through the respective apertures 15, so that subject images as much as the apertures 15 are formed as subject information units on an imaging surface of the imaging device 14 by the pinhole effect.

The imaging device 14 converts each subject image (subject information unit) formed on the imaging surface into an electric signal every pixel and outputs the electric signals. A signal processing circuit 16 is arranged downstream of the imaging device 14. The signal processing circuit 16 performs desired signal processing on the electric signals output from the imaging device 14 on the basis of the subject information units. Specifically, the signal processing includes correction of the difference among the subject information units, subject image detection, subject motion detection, and subject recognition. The signal processing will be described in detail below.

The imaging principle of the imaging apparatus with the above structure according to the present embodiment will now be described.

Light from the subject 17 is guided into the package 12, serving as the dark box, through the apertures 15 in the light shielding plate 13. At that time, each aperture 15 forms a subject image on the imaging surface of the imaging device 14 by the pinhole effect. In this instance, the subject images corresponding to the respective apertures 15 are formed on the imaging surface of the imaging device 14. Consequently, the amount of light corresponding to the number of formed subject images, i.e., the number of apertures 15 is obtained on the whole imaging surface.

Figure 2:
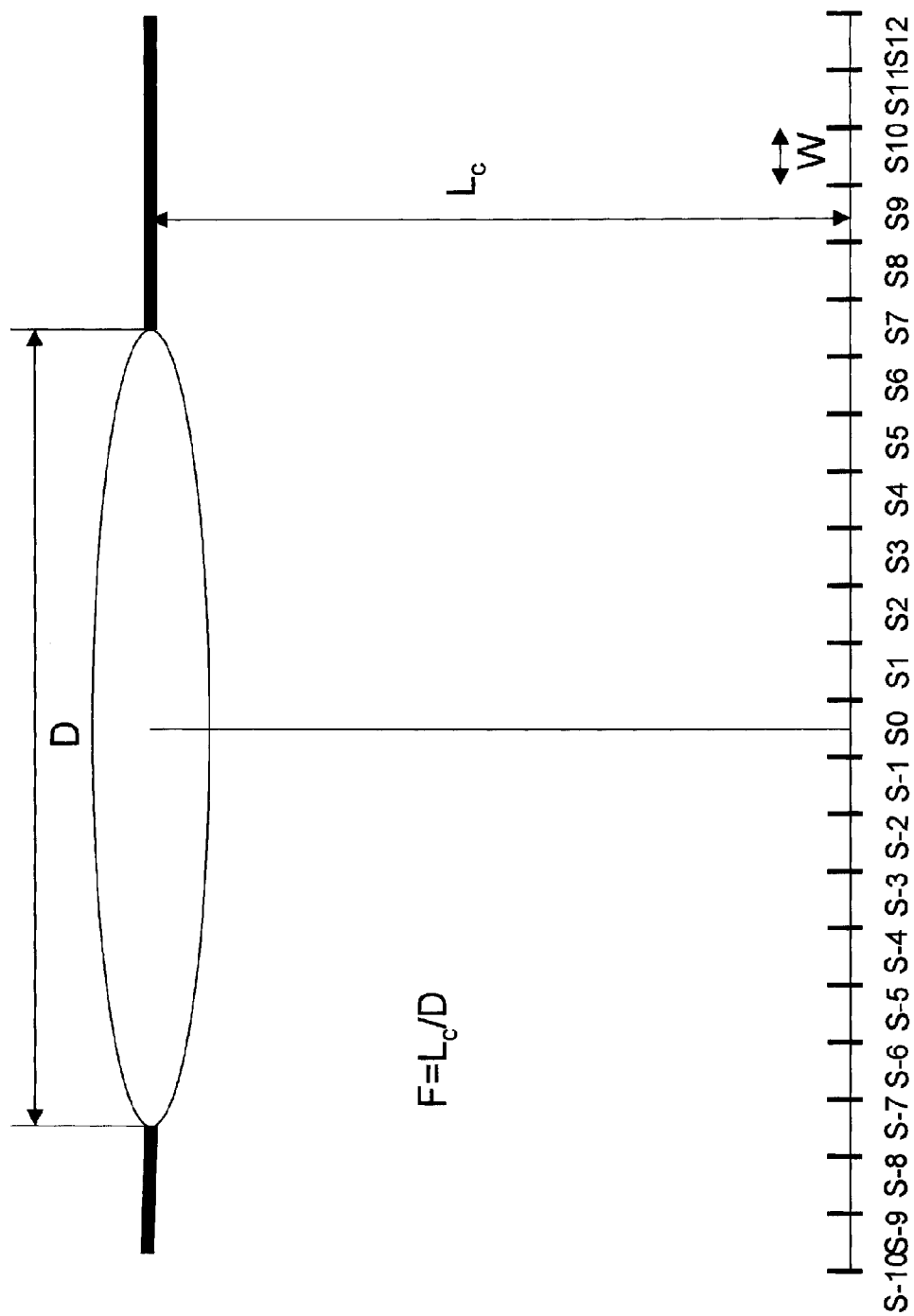
FIG. 2 is a conceptual diagram of a known optical system using a lens.
Figure 3:
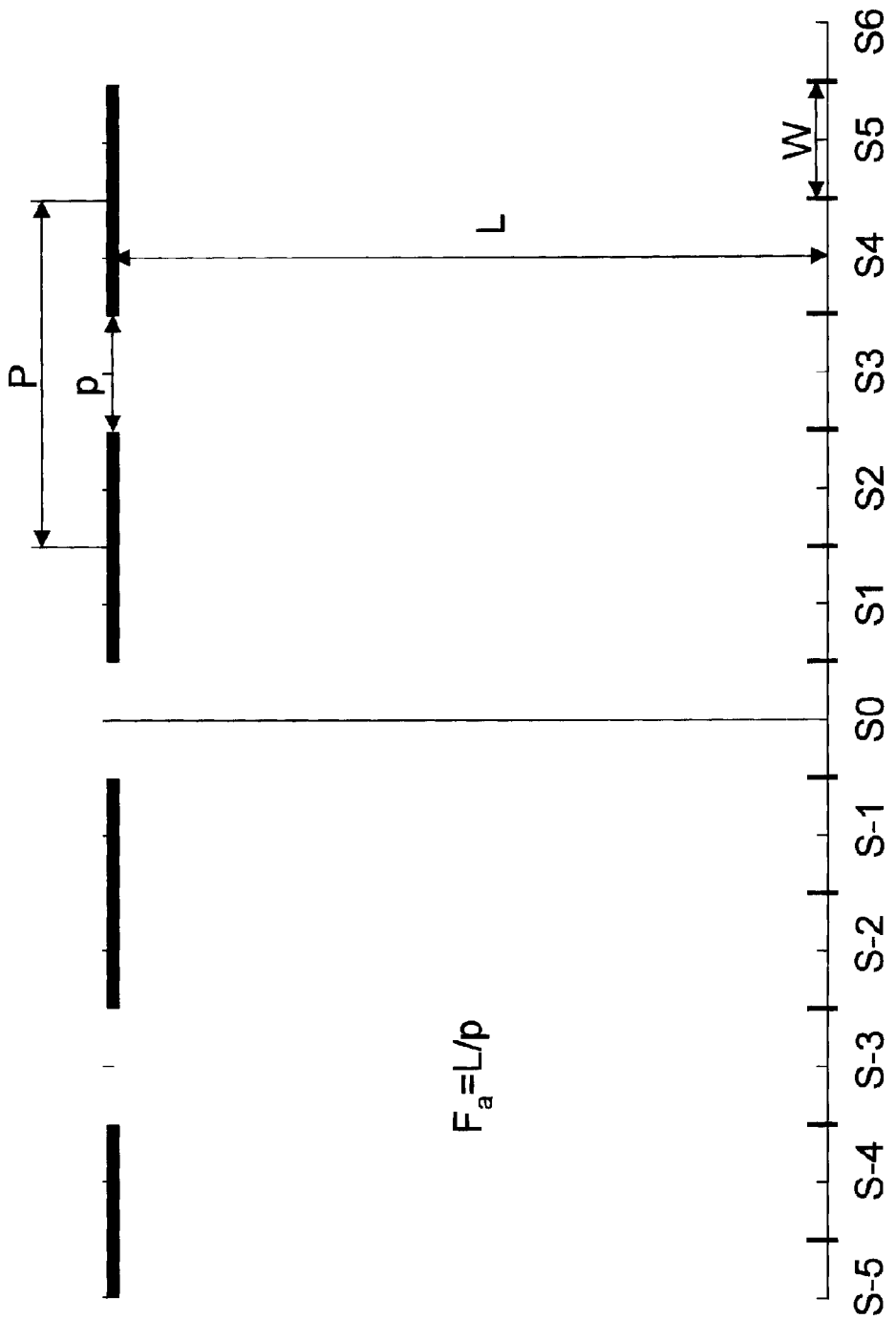
FIG. 3 is a conceptual diagram of an optical system using a plurality of apertures according to the embodiment of the present invention.

An optical system using the apertures 15, constituting the light guide mechanism, according to the present embodiment will be compared with a known optical system using a lens with respect to the energy (brightness) of light incident on the imaging device with reference to FIGS. 2 and 3. FIG. 2 is a conceptual diagram of the known optical system using a lens. FIG. 3 is a conceptual diagram of the optical system using the apertures 15 according to the present embodiment of the present invention.

Regarding the F-number (focal length/diaphragm aperture diameter) of a lens in an imaging apparatus used in a digital still camera or a mobile phone, the F-number is about 2.8. On the other hand, the F-number in the imaging apparatus according to the present embodiment is obtained by the following expression on the assumption that the diameter p of each aperture 15 is 3 μm and the distance L between the light shielding plate 13 and the imaging surface of the imaging device 14 is 3 mm.

$$Fa = L/p = 3000 \text{ μm}/3 \text{ μm} = 1000$$

Therefore, the ratio of the F-number of the lens, i.e., F=2.8 to that according to the present embodiment, i.e., in the use of the apertures 15 instead of a lens is obtained by the following expression:

$$F/Fa = 2.8/1000$$

In this case, the ratio of energy of light incident on the imaging device 14 in the case using the lens and that in the case of using the apertures is as follows:

$$(F/Fa)^2 = 0.00000784$$

The reciprocal thereof is 127,551.

For example, when a device of which the pixel size is 3 μm, the number of pixels in the horizontal direction is 1,000, the number of pixels in the vertical direction is 1,000, and the total number of pixels is 1,000,000 is used as the imaging device 14, the number of apertures 15 is 127, 551 on the condition that the energy of light incident on the imaging device 14 is equivalent to that in the optical system using the lens with F=2.8.

As will be obviously understood from a result of the above-described comparison, about 100,000 apertures 15 are formed in the light shielding plate 13, thus obtaining the energy (brightness) of light equivalent to that of a known imaging apparatus used in a digital still camera or a mobile phone. According to the present embodiment, therefore, the apertures 15 whose number corresponds to the total number of pixels of the imaging device 14 are formed, thus providing enough energy as the energy of light incident on the imaging device 14, the energy being higher than that in an imaging apparatus used in a digital still camera or a mobile phone.

The number of apertures 15 is described above. Regarding the size of an aperture formation region where the apertures 15 are formed in the light shielding plate 13, in order to permit the beams of light to be incident on pixels in the periphery of an effective pixel region (including pixels actually used for imaging information) of the imaging device 14 so as to provide energy equivalent to that of pixels in the center of the effective pixel region, the aperture formation region is set larger than the effective pixel region of the imaging device 14. Preferably, the area ratio of the aperture formation region to the effective pixel region is, for example, 9:1.

The size of the aperture formation region in the light shielding plate 13 relative to the effective pixel region of the imaging device 14 also depends on the relationship between the angle of view of the imaging device 14 and the distance L between the light shielding plate 13 and the imaging surface of the imaging device 14. For instance, assuming that the effective pixel region is 3 mm (in the horizontal direction)×3 mm (in the vertical direction) and the distance L is 3 mm, when the angle of view is set to 90 degrees, the area of the aperture formation region in the light shielding plate 13 is nine times as large as the effective pixel region. Thus, the energy of light incident on all of the pixels in the effective pixel region can be substantially uniformed.

As described above, subject information units, i.e., subject images are formed on the imaging surface of the imaging device 14 through the apertures 15, so that the energy of light corresponding to the number of apertures 15 can be obtained on the entire imaging surface. Therefore, the necessary amount of light can be obtained by appropriately setting the number of apertures 15. However, the subject images are formed on the imaging surface such that the formed images are shifted relative to one another by the amount of shift corresponding to the pitch of the apertures 15, i.e., the subject information units differ from one another by the amount of shift. The shifts among the subject images (i.e., the differences among subject information units) formed on the imaging surface are corrected by signal processing performed by the signal processing circuit 16. The details of the signal processing will be described below.

Shape of Aperture

In this instance, the shape of each aperture 15 will now be described. The apertures 15 with various shapes are available. Some examples of the shapes of the apertures 15 will be described below.

First Example

Figure 4:
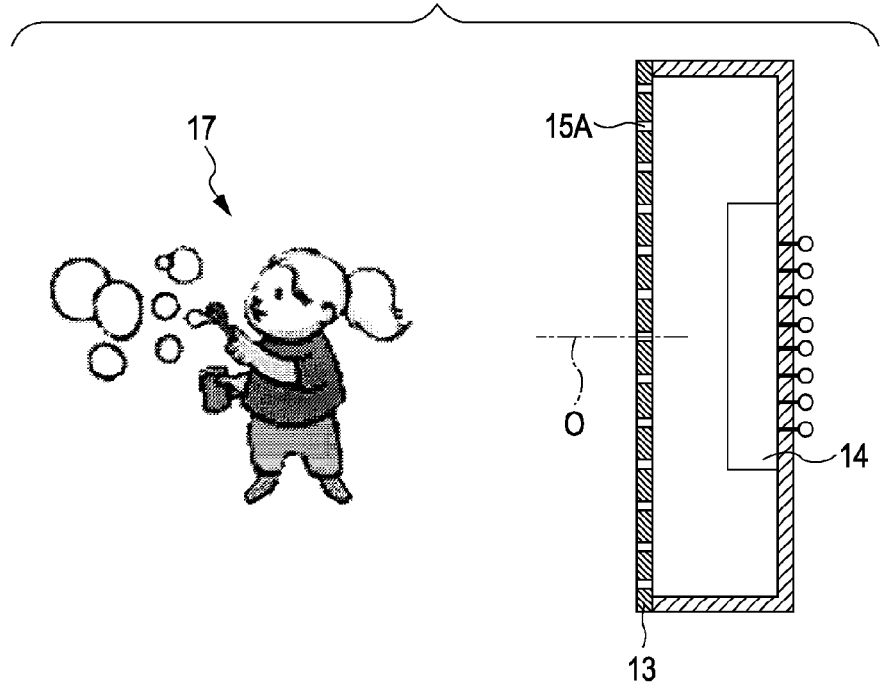
FIG. 4 is a cross-sectional view illustrating the cross-sectional shape of each aperture according to a first example.

FIG. 4 is a cross-sectional view illustrating the cross-sectional shape of each aperture 15A according to a first example. In the first example, the cross-sectional area of each aperture 15A is uniform in the direction from the subject 17 to the imaging device 14, i.e., in the direction from the surface of the light shielding plate 13 close to the subject 17 to the surface thereof close to the imaging device 14. In addition, the axis O of each aperture 15A is orthogonal to the surface of the light shielding plate 13. In other words, the apertures 15 have the same shape.

Second Example

Figure 5:
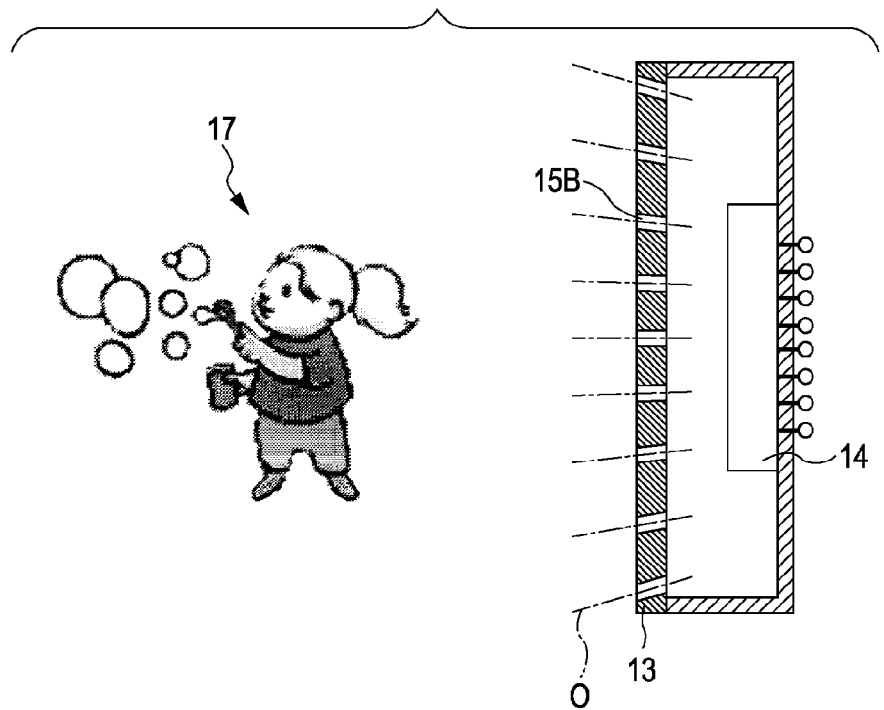
FIG. 5 is a cross-sectional view illustrating the cross-sectional shape of each aperture according to a second example.

FIG. 5 is a cross-sectional view illustrating the cross-sectional shape of each aperture 15B according to a second example. In the second example, the cross-sectional area of each aperture 15B is uniform in the direction from the surface of the light shielding plate 13 close to the subject 17 to the surface thereof close to the imaging device 14 such that the axes O of the respective apertures 15B are converged to the imaging device 14. In other words, the inclination of the axis O of each aperture 15B depends on the position of the aperture 15B. Therefore, the shape of the aperture 15B depends on the position thereof.

Third Example

Figure 6:
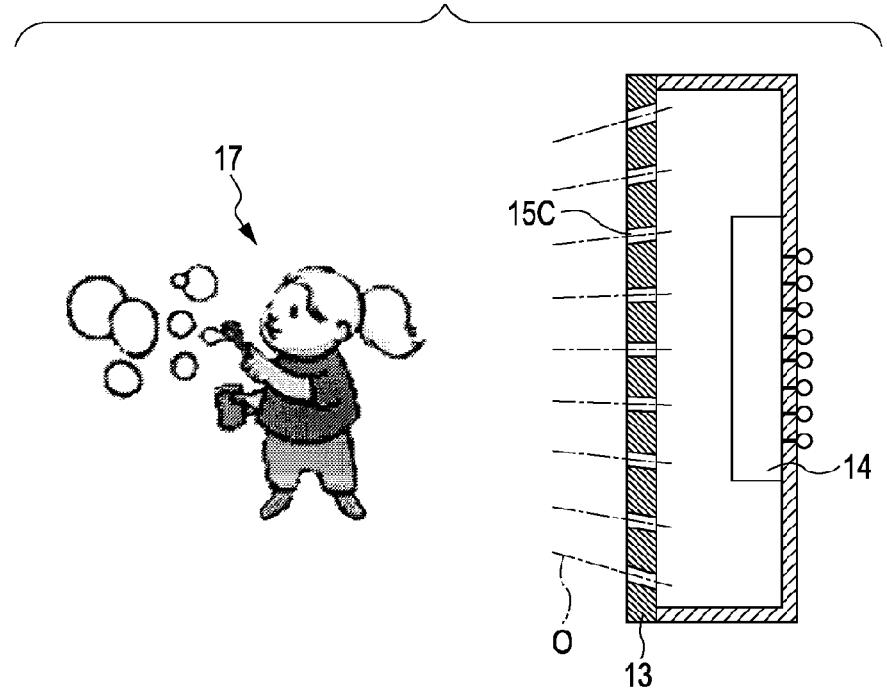
FIG. 6 is a cross-sectional view illustrating the cross-sectional shape of each aperture according to a third example.

FIG. 6 is a cross-sectional view illustrating the cross-sectional shape of each aperture 15C according to a third example. In the third example, the cross-sectional area of each aperture 15C is uniform in the direction from the surface of the light shielding plate 13 close to the subject 17 to the surface thereof close to the imaging device 14 such that the axes O of the respective apertures 15C are diverged toward the imaging device 14. In other words, the inclination of the axis O of each aperture 15C depends on the position of the aperture 15C. Therefore, the shape of the aperture 15C depends on the position thereof.

Fourth Example

Figure 7:
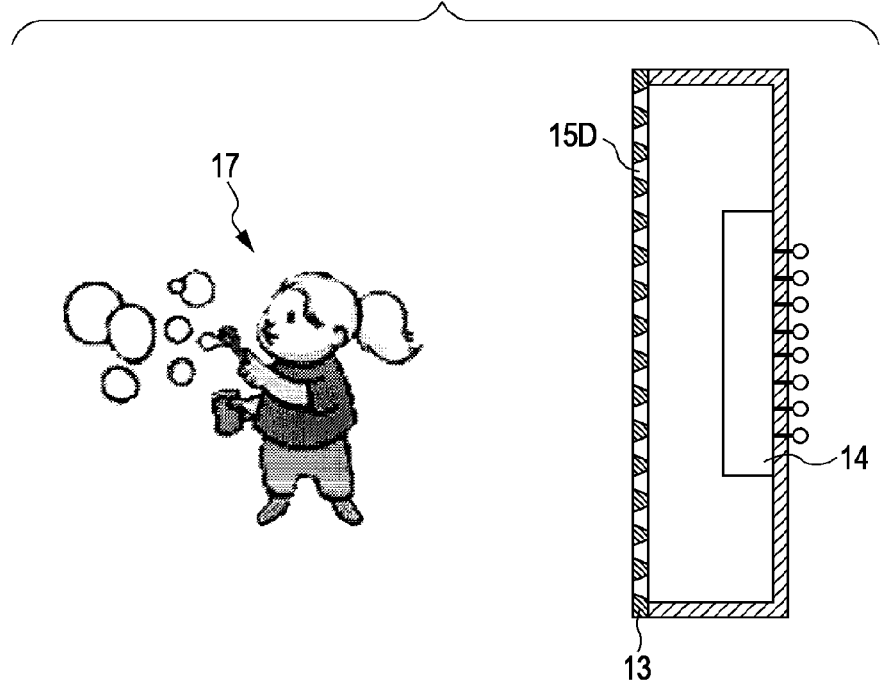
FIG. 7 is a cross-sectional view illustrating the cross-sectional shape of each aperture according to a fourth example.

FIG. 7 is a cross-sectional view illustrating the cross-sectional shape of each aperture 15D according to a fourth example. In the fourth example, the cross-sectional area of each aperture 15D varies in the direction from the surface of the light shielding plate 13 close to the subject 17 to the surface thereof close to the imaging device 14. Specifically, the cross-sectional thereof gradually increases in this direction. The axes O of the respective apertures 15D are orthogonal to the surface of the light shielding plate 13. In other words, the apertures 15D have the same shape.

Fifth Example

Figure 8:
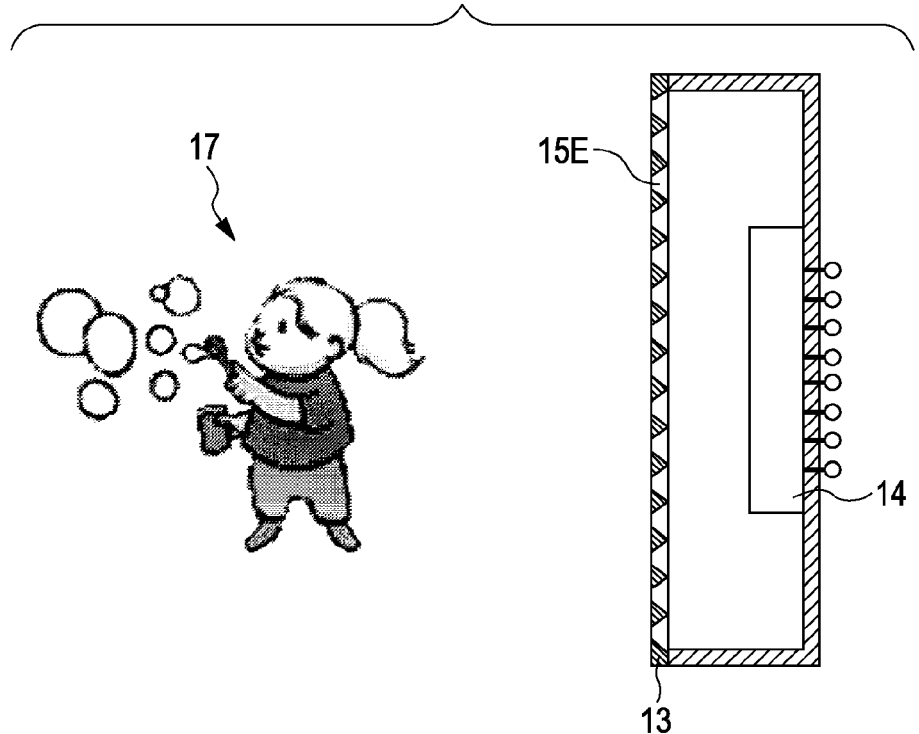
FIG. 8 is a cross-sectional view illustrating the cross-sectional shape of each aperture according to a fifth example.

FIG. 8 is a cross-sectional view illustrating the cross-sectional shape of each aperture 15E according to a fifth example. In the fifth example, the cross-sectional area of each aperture 15E gradually increases in the direction from the surface of the light shielding plate 13 close to the subject 17 to the surface thereof close to the imaging device 14 and the axes O of the respective apertures 15E are orthogonal to the surface of the light shielding plate 13 in the same way as the apertures 15D according to the fourth example. However, the opening area of each aperture 15E at the surface of the light shielding plate 13 close to the imaging device 14 is larger than that of the aperture 15D according to the fourth example.

Sixth Example

Figure 9:
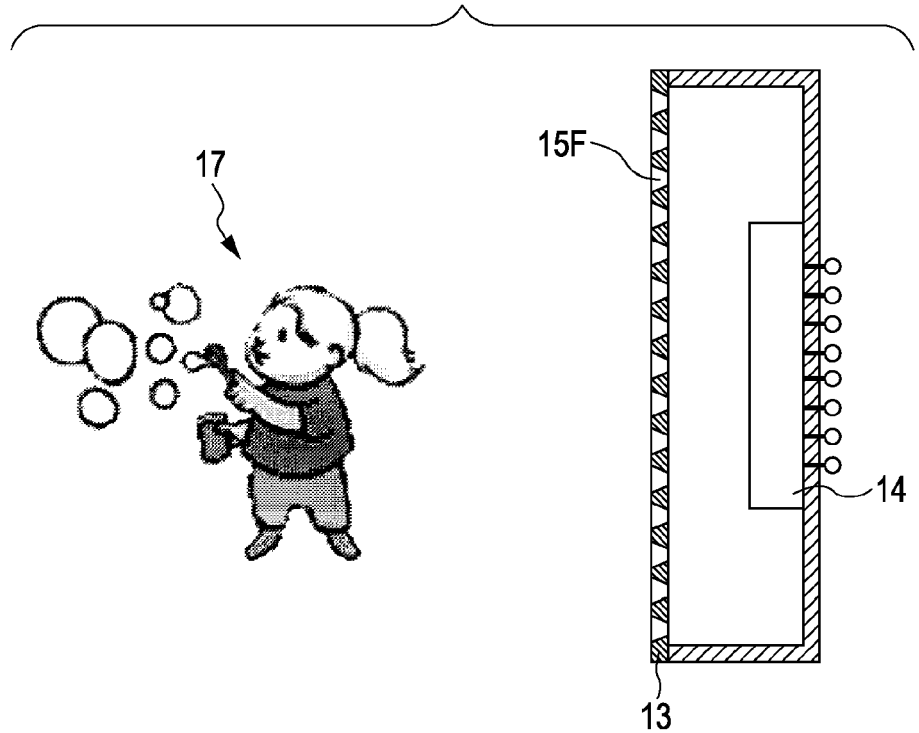
FIG. 9 is a cross-sectional view illustrating the cross-sectional shape of each aperture according to a sixth example.

FIG. 9 is a cross-sectional view illustrating the cross-sectional shape of each aperture 15F according to a sixth example. In the sixth example, the direction of spreading (hereinafter, orientation) of each aperture 15F is opposite to that of the aperture 15D according to the fourth example. In other words, the cross-sectional area of each aperture 15F gradually decreases in the direction from the surface of the light shielding plate 13 close to the subject 17 to the surface thereof close to the imaging device 14 and the axes O of the respective apertures 15F are orthogonal to the surface of the light shielding plate 13.

Seventh Example

Figure 10:
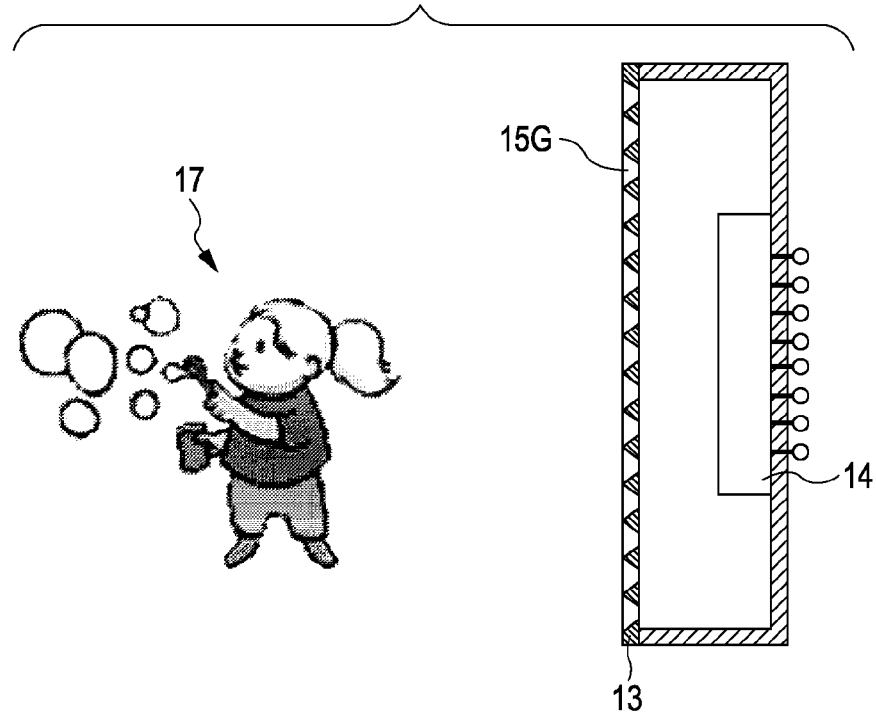
FIG. 10 is a cross-sectional view illustrating the cross-sectional shape of each aperture according to a seventh example.

FIG. 10 is a cross-sectional view illustrating the cross-sectional shape of each aperture 15G according to a seventh example. In the seventh example, the orientation of each aperture 15G is opposite to that of the aperture 15E according to the fifth example. In other words, the cross-sectional area of each aperture 15G gradually decreases in the direction from the surface of the light shielding plate 13 close to the subject 17 to the surface thereof close to the imaging device 14 and the axis O of the respective apertures 15G are orthogonal to the surface of the light shielding plate 13 in the same way as the apertures 15F according to the sixth example. However, the opening area of each aperture 15G at the surface of the light shielding plate 13 close to the subject 17 is larger than that of the aperture 15F according to the sixth example.

The seven examples of the shape of the aperture 15 have been described. The shape of the aperture 15 is not limited to those examples. Any of the apertures 15A to 15G is appropriately selected as an aperture having the shape suitable for imaging conditions. Particularly, the use of the apertures each having the cross-sectional area varying in the direction from the surface of the light shielding plate 13 close to the subject 17 to the surface thereof close to the imaging device 14, i.e., any of the apertures 15D to 15G according to the fourth to seventh examples reduces the loss of light incident on the imaging device 14. Advantageously, the sensitivity of the present imaging apparatus can be increased.

In the fourth and fifth examples, the apertures 15D and 15E each have a large opening that is close to the imaging device 14. The apertures of this type will be termed "apertures of a first orientation". In the sixth and seventh examples, the apertures 15F and 15G each have a large opening that is close to the subject 17. The apertures of this type will be termed "apertures of a second orientation". In each of the fourth to seventh examples, all of the apertures have the same orientation. The apertures may have different orientations, i.e., the apertures of the first and second orientations may be arranged.

The arrangement of apertures of different orientations, i.e., the first and second orientations increases the intensity of light incident on the periphery of the imaging device 14, enabling an improvement in shading.

In the above-described first to seventh examples of the apertures 15, the apertures 15 are arranged in the flat light shielding plate 13. The light shielding plate 13 in which the apertures 15 are arranged is not limited to a flat plate. For example, a curved plate can be used.

Figure 11A:
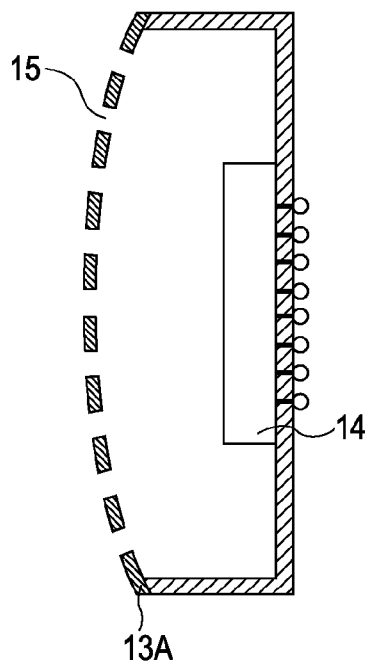
FIGS. 11A and 11B are cross-sectional views illustrating other light shielding plates.
Figure 11B:
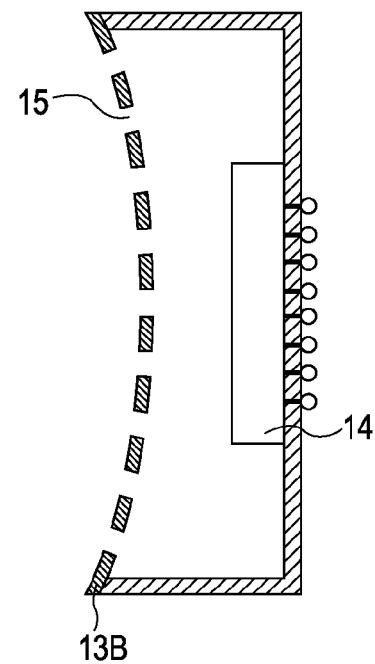

Referring to FIG. 11A, a convex light shielding plate 13A which protrudes toward the subject 17 can be used. Any type of the apertures 15A to 15G according to the above-described first to seventh examples may be arranged in the light shielding plate 13A. Referring to FIG. 11B, a concave light shielding plate 13B which protrudes toward the imaging device 14 can be used. Any type of the apertures 15A to 15G according to the above-described first to seventh examples may be arranged in the light shielding plate 13B.

The use of the curved plate, serving as the light shielding plate 13, increases the intensity of light incident on the periphery of the imaging device 14, enabling an improvement in shading.

Modifications

The foregoing embodiment has been described on the assumption that the apertures 15 are arranged at the same pitch. However, it is unnecessary to arrange the apertures 15 at the same pitch. The apertures 15 may be arranged at different pitches.

Figure 12B:
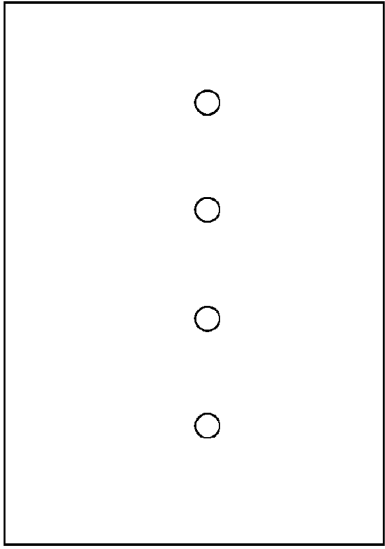
FIGS. 12A to 12C are diagrams explaining apertures of different numbers.
Figure 12C:
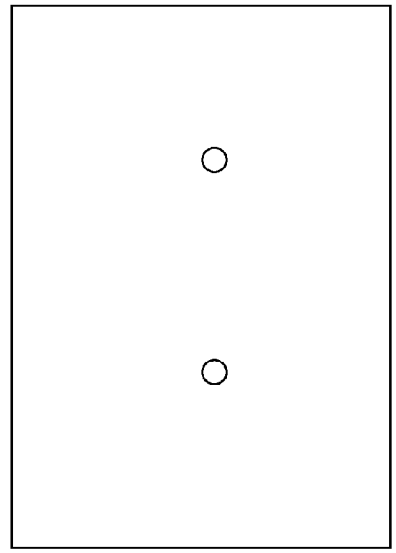
Figure 12A:
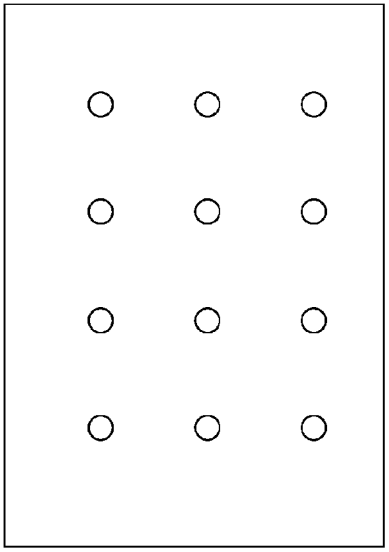

In the foregoing embodiment, the number of apertures 15 is the same as the number of pixels of the imaging device 14. However, it is unnecessary to arrange the apertures 15 as much as the pixels of the imaging device 14. The number of apertures 15 may be arbitrarily set. Some examples are shown in FIGS. 12A to 12C. FIG. 12A illustrates arrangement of twelve apertures. FIG. 12B illustrates arrangement of four apertures. FIG. 12C illustrates arrangement of two apertures.

Figure 13A:
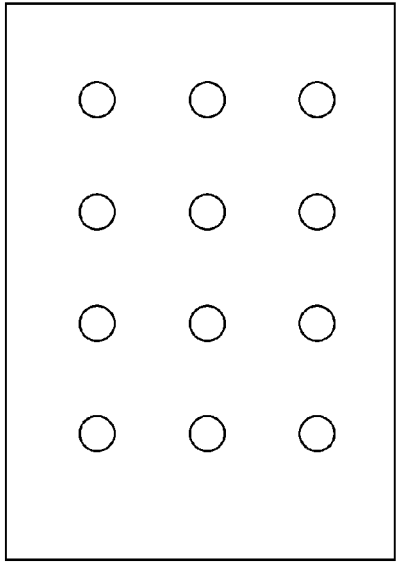
FIGS. 13A to 13C are diagrams explaining apertures of different sizes.
Figure 13B:
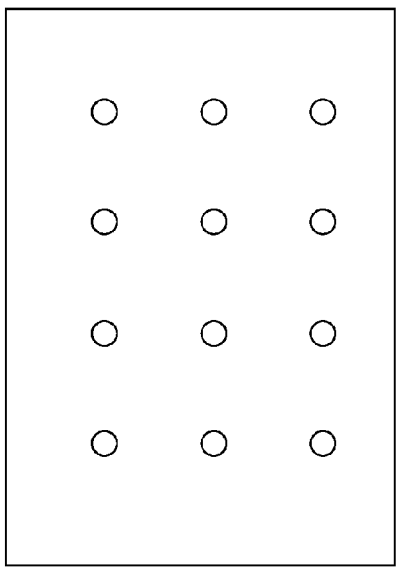
Figure 13C:
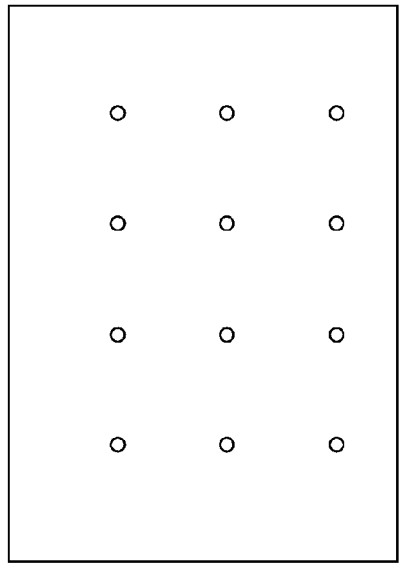

The size of each aperture 15 is not fixed. FIGS. 13A to 13C illustrate some examples. FIG. 13A illustrates arrangement of relatively middle sized apertures. FIG. 13B illustrates arrangement of large apertures. FIG. 13C illustrates arrangement of small apertures. The apertures 15 may have any size. Furthermore, different sized apertures, for example, three different sized apertures may be arranged as shown in FIG. 14A. Various patterns of use of those apertures are available. Referring to FIG. 14B, the middle sized apertures may be used such that the small and large apertures are blocked. Referring to FIG. 14C, the small apertures may be used such that the large and middle sized apertures are blocked. Referring to FIG. 14D, the large apertures may be used such that the small and middle sized apertures are blocked.

Figure 15A:
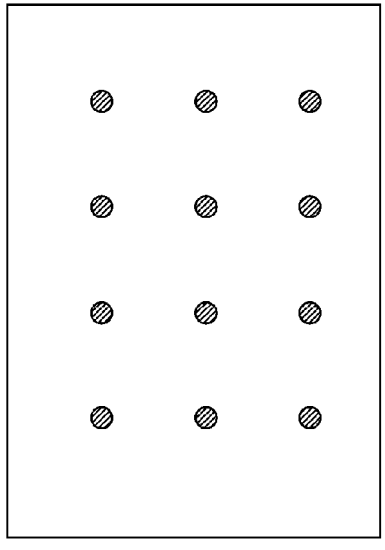
FIGS. 15A to 15D are diagrams explaining apertures of different transmittances.
Figure 15C:
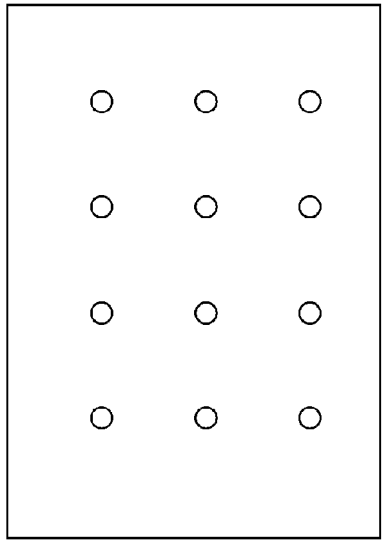
Figure 15B:
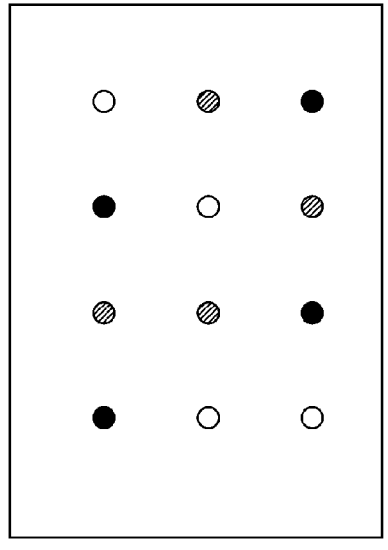
Figure 15D:
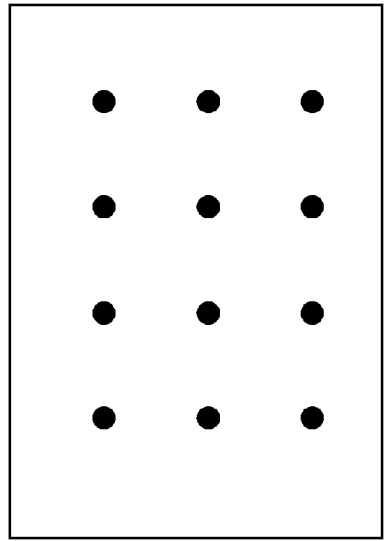

The transmittance of each aperture 15 is not limited to a predetermined transmittance. The transmittance thereof can be arbitrarily set as shown in FIGS. 15A to 15C. FIG. 15A illustrates arrangement of apertures having a maximum transmittance. FIG. 15B illustrates arrangement of apertures having a medium transmittance. FIG. 15C illustrates arrangement of apertures having a minimum transmittance. Furthermore, apertures of at least two different transmittances may be arranged. As shown in FIG. 15D, apertures of three different transmittances, i.e., the maximum, medium, and minimum transmittances may be arranged.

Since the apertures of at least two different transmittances are arranged as described above, subject images can be formed on the imaging surface of the imaging device 14 so as to provide a light intensity distribution based on the respective transmittances. It is assumed that a minimum transmittance of 0% is achieved by completely blocking the relevant aperture. When a shutter is arranged to each aperture 15 in order to achieve the minimum transmittance, a shutter of a camera is not needed. Advantageously, the size and weight of the present imaging apparatus can be reduced.

Figure 16B:
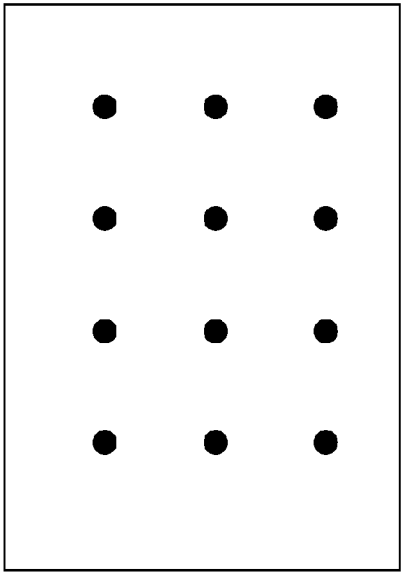
FIGS. 16A to 16D are diagrams explaining apertures of different spectral transmission characteristics.
Figure 16D:
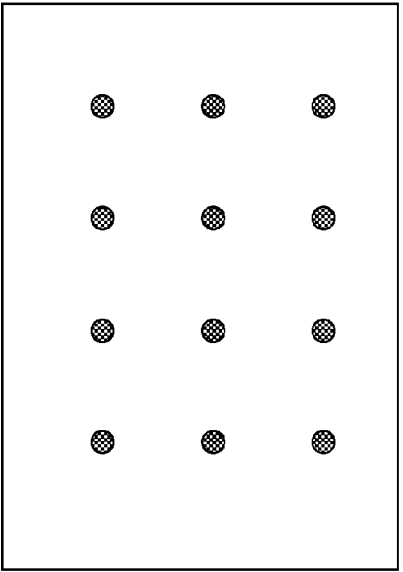
Figure 16A:
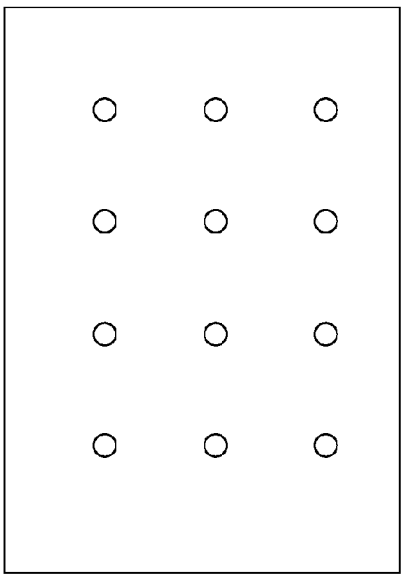
Figure 16C:
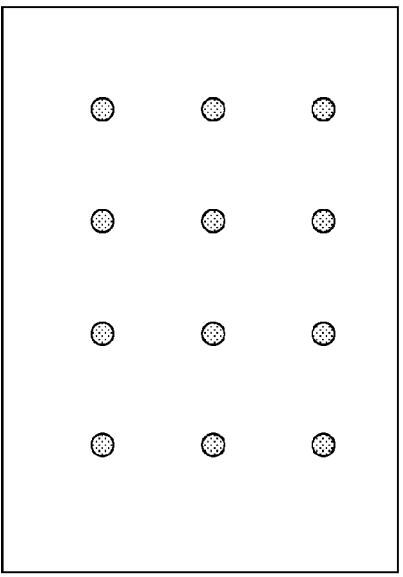

The spectral transmission characteristics of the apertures 15 will now be described with reference to FIGS. 16A to 16D. When the apertures 15 are completely transparent holes, the spectral transmission characteristics cover the full wavelength range. On the other hand, the spectral transmission characteristics in a specific wavelength range can be provided. FIG. 16B illustrates arrangement of apertures having the spectral transmission characteristics in the red wavelength range. FIG. 16C illustrates arrangement of apertures having the spectral transmission characteristics in the green wavelength range. FIG. 16D illustrates arrangement of apertures having the spectral transmission characteristics in the blue wavelength range. Since the apertures 15 have the spectral transmission characteristics, a prism for a 3-CCD imaging system is not needed. Advantageously, the size and weight of the present imaging apparatus can be reduced.

Figure 17A:
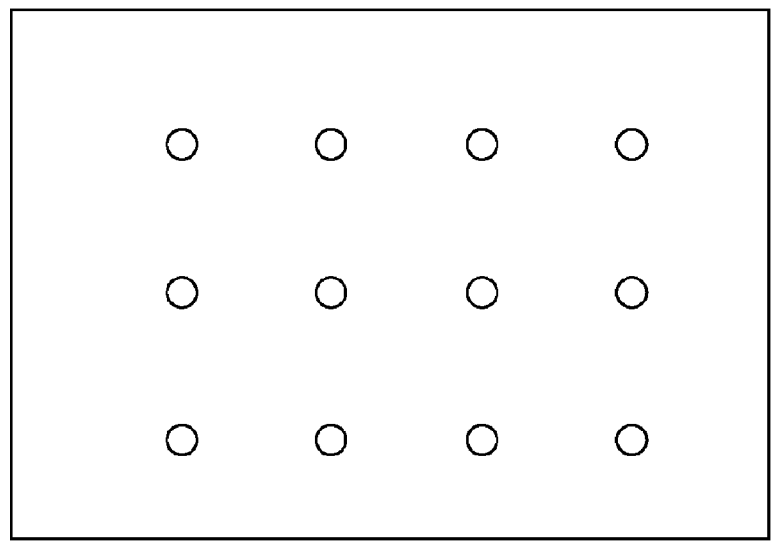
FIGS. 17A and 17B are diagram explaining apertures having a lens.
Figure 17B:
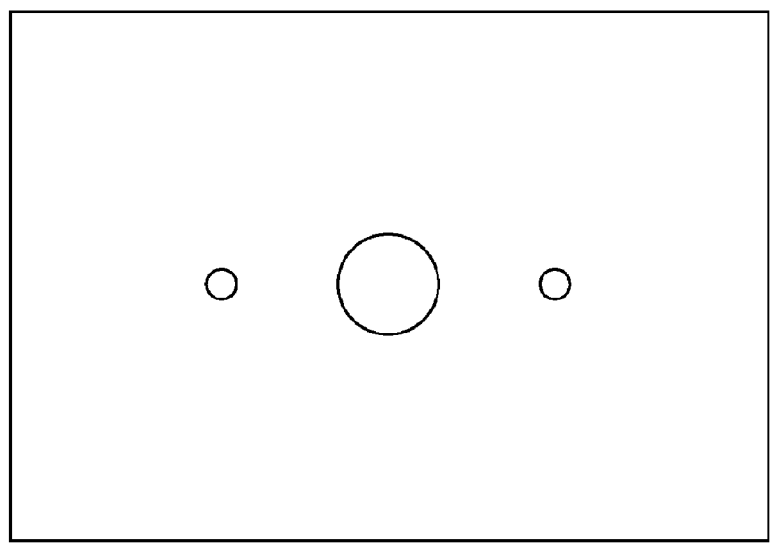
Figure 24:
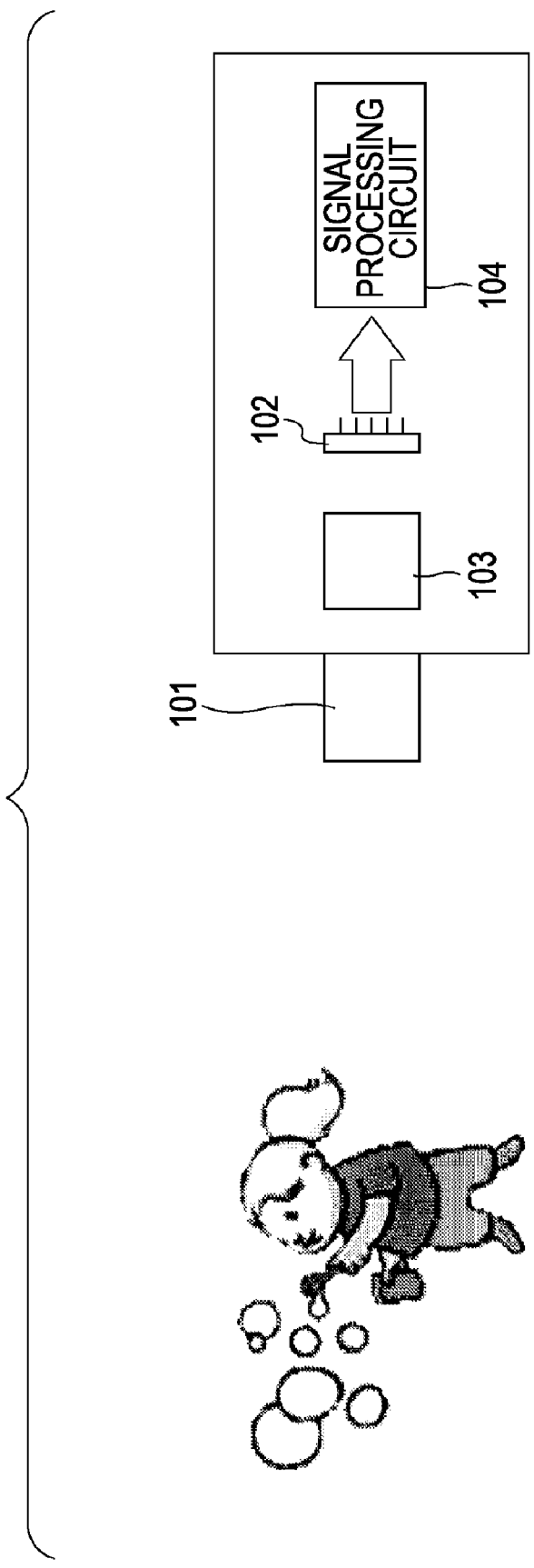
FIG. 24 is a schematic diagram illustrating the fundamental structure of an imaging apparatus using an imaging lens.

Each aperture 15 may have a lens. Attaching a lens to each aperture 15 can permit the solid angle, intensity, and angle of light incident on the imaging device 14 to have flexibility derived from the design of the lens. Regarding attachment of lenses to the apertures 15, various patterns are available. FIG. 17A illustrates arrangement of apertures each having a lens. A combination of at least one aperture having a lens and at least one aperture having no lens may be used. FIG. 17B illustrates a combination of a large aperture having a lens and apertures having no lens.

Particularly, in the use of arrangement of at least one aperture having a lens and at least one aperture having no lens, when the ambient light is dark, light passing through the lens which has a small F-number (bright) is used. When the ambient light is bright, light passing through the lens is controlled and light passing through the aperture having no lens is used. As for the amount of light, a wide variable range of F-number from 1.4 to about 1000 can be realized in practical use.

Even when the intensity of light passing through the lens is so high that the pixels of the imaging device 14 are partially saturated, signal processing is performed on the basis of a signal output from the imaging device 14, the signal being based on light passing through the aperture having no lens. Thus, an image having a wide dynamic range can be obtained. Furthermore, various processes, such as electronic zooming, stereoscopic imaging, high resolution processing, wide dynamic range processing, color characteristics processing, demosaic processing, low noise processing, and high sensitivity processing, can be performed by a single camera system.

Signal Processing Circuit

The signal processing circuit 16 for correcting the differences among subject information units (subject images) formed on the imaging surface of the imaging device 14 through the apertures 15 will now be described below.

The signal processing circuit 16 performs arithmetic processing using a coefficient determined on the basis of the intensity distribution of light incident on the imaging device 14 to obtain subject information units. The intensity distribution of light incident on the imaging device 14 is determined on the basis of the pitch of the apertures 15, the size of each aperture 15, the shape thereof, the cross-sectional shape thereof, the orientation thereof, the position thereof, the transmittance distribution of each aperture 15, the distance between each aperture 15 and the imaging device 14, the distance between each aperture 15 and the subject 17, the diffraction of light through each aperture 15, and the interference of light through the apertures 15.

Particularly, the transmittance distributions of the apertures 15 are changed, thus preventing the influence of diffraction of light passing through the apertures 15, specifically, a decrease in resolution due to the diffraction. The same advantages can be obtained in not only the use of the plurality of apertures 15 but also the use of a single aperture 15.

FIGS. 18 to 20 illustrate examples of the transmittance distribution of the aperture 15. FIG. 18 illustrates a uniform apodization function. FIG. 19 shows a Blackman apodization function. FIG. 20 illustrates a Bartlett apodization function.

The term "apodization" means a method of improving the imaging properties of an optical system. Apodization is achieved by allowing the apertures 15 to have the transmittance distribution in order to reduce the intensity of diffraction rings surrounding the Airy disk, serving as an image with no aberration created by diffracting light from a pinpoint light source through the aperture.

FIG. 21 illustrates examples of other functions with respect to the transmittance distribution. The apodization functions $B_A(x)$, $B_I(k)$, $Hm_A(x)$, $Hm_I(k)$, $Hn_A(x)$, $Hn_I(k)$, and $W_I(k)$ are expressed by Expression 1.

$$B_A(x) = 0.42 + 0.5\cos\left(\frac{\pi x}{a}\right) + 0.08\cos\left(\frac{2\pi x}{a}\right) \quad (1)$$

$$B_I(k) = \frac{a(0.84 - 0.36a^2 k^2)\mathrm{sinc}(2\pi ak)}{(1 - a^2 k^2)(1 - 4a^2 k^2)}$$

$$Hm_A(x) = 0.54 + 0.46\cos\left(\frac{\pi x}{a}\right)$$

$$Hm_I(k) = \frac{a(1.08 - 0.64a^2 k^2)\mathrm{sinc}(2\pi ak)}{1 - 4a^2 k^2}$$

$$Hn_A(x) = \cos^2\left(\frac{\pi x}{2a}\right)$$
$$= \frac{1}{2}\left[1 + \cos\left(\frac{\pi x}{a}\right)\right]$$

$$Hn_I(k) = \frac{a\,\mathrm{sinc}(2\pi ak)}{1 - 4a^2 k^2}$$
$$= a\left[\mathrm{sinc}(2\pi ka) + \frac{1}{2}\mathrm{sinc}(2\pi ka - \pi) + \frac{1}{2}\mathrm{sinc}(2\pi ka + \pi)\right]$$

$$W_I(k) = a2\sqrt{2\pi}\,\frac{J_{3/2}(2\pi ka)}{(2\pi ka)^{3/2}}$$
$$= a\frac{\sin(2\pi ka) - 2\pi ak\cos(2\pi ak)}{2a^3 k^3 \pi^3}.$$

For the sake of easy understanding of signal processing by the signal processing circuit 16, a one-dimensional model shown in FIG. 22 will be described as an example of the imaging device 14. In the one-dimensional model, pixels are arranged one-dimensionally. Referring to FIG. 22, reference symbol L denotes the distance between the light shielding plate 13 and the imaging surface of the imaging device 14, P denotes the pitch of the apertures 15, p denotes the diameter of each aperture 15, A denotes the aperture ratio (=p/P), and m indicates a coefficient. In this case, it is assumed that the pitch P is equal to the pitch between pixels.

Information Si supplied to a pixel Si (i denotes a pixel number) of the imaging device 14 is expressed by Expression 2:

$$S_i = \sum_{j=-N}^{N} k_{ij} B_j \quad (2)$$

$$\begin{pmatrix} S_{-N} \\ S_{-(N-1)} \\ S_i \\ S_N \end{pmatrix} =$$

$$\begin{pmatrix} k_{-N-N} & k_{-N-(N-1)} & k_{-Nj} & k_{-NN} \\ k_{-(N-1)-N} & k_{-(N-1)-(N-1)} & k_{-(N-1)j} & k_{-(N-1)N} \\ k_{i-N} & k_{i-(N-1)} & k_{ij} & k_{iN} \\ k_{N-N} & k_{N-(N-1)} & k_{Nj} & k_{NN} \end{pmatrix} \begin{pmatrix} B_{-N} \\ B_{-(N-1)} \\ B_j \\ B_N \end{pmatrix}$$

$$i = -N, -(N-1), \ldots -1, 0, 1, 2, \ldots, N$$
$$j = -N, -(N-1), \ldots -1, 0, 1, 2, \ldots, N$$
$$k_{ij} = A\cos^2\theta_{ij}$$

where $k_{ij}$ is a coefficient defined by the pitch P of the apertures 15 and the diameter p of the aperture 15.

Information (in this instance, light including visible light or electromagnetic radiation, such as near infrared radiation, infrared radiation, or ultraviolet radiation) Bj from the subject 17 is obtained by arithmetic processing. If the information Si relates to only the brightness of the subject 17, brightness information can be reproduced as the information Bj by arithmetic processing. When the information Si relates to the color of the subject 17, color information can be reproduced as the information Bj by arithmetic processing.

If there is brightness information alone, the brightness information Bj of the subject 17 can be calculated by arithmetic processing based on Expression 3. To reproduce the color of the subject 17, information units related to several kinds of colors, such as red, blue, and green, are obtained as output signals of pixels. Thus, color information of the subject 17 can be similarly obtained by arithmetic processing based on Expression 3.

$$B_j = f(S_i, k_{ij}) \quad (3)$$

$$\begin{pmatrix} B_{-N} \\ B_{-(N-1)} \\ B_j \\ B_N \end{pmatrix} = \begin{pmatrix} k_{-N,-N} & k_{-N,-(N-1)} & k_{-N,j} & k_{-N,N} \\ k_{-(N-1),-N} & k_{-(N-1),-(N-1)} & k_{-(N-1),j} & k_{-(N-1),N} \\ k_{i,-N} & k_{i,-(N-1)} & k_{ij} & k_{iN} \\ k_{N,-N} & k_{N,-(N-1)} & k_{Nj} & k_{NN} \end{pmatrix}^{-1} \begin{pmatrix} S_{-N} \\ S_{-(N-1)} \\ S_i \\ S_N \end{pmatrix}$$

$$i = -N, -(N-1), \ldots -1, 0, 1, 2, \ldots, N$$
$$j = -N, -(N-1), \ldots -1, 0, 1, 2, \ldots, N$$
$$k_{ij} = A\cos^2\theta_{ij}$$

As approaches to obtaining color information as a pixel output signal, all of known color separating methods are available. For example, a method for achieving color separation through a prism and imaging using a 3-chip (3-CCD) imaging system, a method using an on-chip color filter on an imaging device, a method of arranging color filters in the apertures 15, and a method for achieving color separation through a pixel portion of an imaging device can be used.

As described above, the information Bj, obtained by arithmetic processing through the signal processing circuit 16, as brightness information or color information of the subject 17 is shown on a display, thus reproducing an image of the subject 17 as a one-dimensional image.

For the sake of easy understanding, the one-dimensional model has been described above as an example. FIG. 23 shows a two-dimensional model. In the case of the two-dimensional model, Expression 4 and Expression 5 correspond to Expression 2 and Expression 3 for the one-dimensional model, respectively. The signal processing circuit 16 performs arithmetic processing based on those expressions to obtain information Bjk as brightness information or color information of the subject 17. When the information Bjk is shown on a display, an image of the subject 17 can be reproduced as a two-dimensional image.

$$S_{hi} = \sum_{j=-N, k=-M}^{N,M} k_{hijk} B_{jk} \quad (4)$$

$$\begin{pmatrix} S_{-N,i} \\ S_{-(N-1),i} \\ S_{h,i} \\ S_{N,i} \end{pmatrix} = \sum_{k=-M}^{M} \left( \begin{pmatrix} k_{-N,i,-N,k} & k_{-N,i,-(N-1),k} & k_{-N,i,j,k} & k_{-N,i,N,k} \\ k_{-(N-1),i,-N,k} & k_{-(N-1),i,-(N-1),k} & k_{-(N-1),i,j,k} & k_{-(N-1),i,N,k} \\ k_{h,i,-N,k} & k_{h,i,-(N-1),k} & k_{h,i,j,k} & k_{h,i,N,k} \\ k_{N,i,-N,k} & k_{N,i,-(N-1),k} & k_{N,i,j,k} & k_{N,i,N,k} \end{pmatrix} \begin{pmatrix} B_{-N,k} \\ B_{-(N-1),k} \\ B_{i,k} \\ B_{N,k} \end{pmatrix} \right)$$

$$h = -N, -(N-1), \ldots -1, 0, 1, 2, \ldots, N$$
$$i = -M, -(M-1), \ldots -1, 0, 1, 2, \ldots, M$$
$$j = -N, -(N-1), \ldots -1, 0, 1, 2, \ldots, N$$
$$k = -M, -(M-1), \ldots -1, 0, 1, 2, \ldots, M$$
$$k_{hijk} = A\cos^2\theta_{hijk}$$

In Expression 4, $k_{hijk}$ is a coefficient determined by the pitch P of the apertures 15 and the diameter p of the aperture 15.

$$B_{jk} = f(S_{hi}, k_{hijk})$$

where f is the inverse function of the following:

$$\begin{pmatrix} S_{-N,i} \\ S_{-(N-1),i} \\ S_{h,i} \\ S_{N,i} \end{pmatrix} = \sum_{k=-M}^{M} \left( \begin{pmatrix} k_{-N,i,-N,k} & k_{-N,i,-(N-1),k} & k_{-N,i,j,k} & k_{-N,i,N,k} \\ k_{-(N-1),i,-N,k} & k_{-(N-1),i,-(N-1),k} & k_{-(N-1),i,j,k} & k_{-(N-1),i,N,k} \\ k_{h,i,-N,k} & k_{h,i,-(N-1),k} & k_{h,i,j,k} & k_{h,i,N,k} \\ k_{N,i,-N,k} & k_{N,i,-(N-1),k} & k_{N,i,j,k} & k_{N,i,N,k} \end{pmatrix} \begin{pmatrix} B_{-N,k} \\ B_{-(N-1),k} \\ B_{i,k} \\ B_{N,k} \end{pmatrix} \right) \quad (5)$$

$$h = -N, -(N-1), \ldots -1, 0, 1, 2, \ldots, N$$
$$i = -M, -(M-1), \ldots -1, 0, 1, 2, \ldots, M$$
$$j = -N, -(N-1), \ldots -1, 0, 1, 2, \ldots, N$$
$$k = -M, -(M-1), \ldots -1, 0, 1, 2, \ldots, M$$
$$k_{hijk} = A\cos^2\theta_{hijk}$$

As described above, light from the subject 17 is guided to the photoelectric conversion portion of the imaging device 14 through the respective apertures 15 arranged in the light shielding plate 13 disposed adjacent to the photoelectric conversion portion of the imaging device 14. Electric signals, obtained by photoelectrically converting the light from the subject 17 through the imaging device 14, are subjected to desired signal processing on the basis of subject information units corresponding to the respective apertures 15, specifically, signal processing for correction of the differences among the subject information units. Thus, a blur-free image of the subject can be captured with the desired amount of light without using an imaging lens. This leads to a reduction in size, weight, and cost of the imaging apparatus.

Since any imaging lens is not used, the difference in signal charge among pixels of the imaging device 14 is small when a subject with a wide dynamic range is captured. Thus, the dynamic range of the imaging device 14 can be effectively utilized. Furthermore, since the present imaging apparatus with no lens has an appropriate structure, the amount of light incident on pixels in the vicinity of the effective pixel region can be prevented from decreasing.

Application of the above-described signal processing circuit 16 is not limited to the imaging apparatus having the apertures 15. The signal processing circuit 16 can be applied to an imaging apparatus having a single aperture 15.

In the foregoing embodiment, signal processing by the signal processing circuit 16 relates to the correction of the differences among subject images (subject information units) formed on the imaging surface of the imaging device 14 through the respective apertures 15. In addition to the correction of the differences to obtain an image of a subject, the signal processing may include various processes, e.g., subject motion detection and subject recognition.

The imaging apparatus according to the foregoing embodiment can be used solely as a general camera system, such as a digital still camera. Since the size, weight, and cost of the apparatus can be reduced, the apparatus can be incorporated as a camera module into a compact portable device, such as a mobile phone. This greatly contributes to the reduced size, weight, and cost of the compact portable device.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
 a photoelectric conversion portion including a plurality of pixel units that convert light incident on the photoelectric conversion portion into a plurality of electrical signals;
 a light guide unit adjacent the photoelectric conversion portion, the light guide unit including a plurality of apertures through which light is guided to the plurality of pixel units in the photoelectric conversion portion; and
 a signal processing unit which processes the plurality of electric signals,
 wherein,
 one pixel unit generates a corresponding electrical signal from light guided to the pixel unit through more than one aperture arranged along same surface of the light guide unit,
 the apertures include at least one aperture having a lens and at least one aperture having no lens,
 the apertures include at least a first aperture and a second aperture each having (i) a first opening through which light enters the aperture, the first opening being on a side of a subject being imaged, and (ii) a second opening through which light exits the aperture, the second opening being on a side of the photoelectric conversion portion, the first and second openings being of different sizes, and
 the first opening of the first aperture is smaller in diameter than the second opening of the first aperture, and the first opening of the second aperture is larger in diameter than the second opening of the second aperture.

2. The imaging apparatus of claim 1, wherein at least two of the apertures are of different sizes.

3. The imaging apparatus of claim 1, wherein at least two of the apertures are of different shapes.

4. The imaging device of claim 1, wherein all of the apertures have an axis along a direction light is guided therethrough, and all the axes have the same orientation with respect to the light conversion portion.

5. The imaging device of claim 1, wherein all of the apertures have the same light transmittance characteristics.

6. The imaging device of claim 1, wherein at least two apertures have different light transmittance characteristics.

7. The imaging device of claim 1, wherein all of the apertures have the same spectral transmission characteristics.

8. The imaging device of claim 1, wherein at least two apertures have different spectral transmission characteristics.

9. The imaging device of claim 1, wherein a number of the apertures equals to a number of the pixel units.

10. The imaging device of claim 1, wherein a number of the apertures and a number of the pixel units are different.

11. The imaging device of claim 1, wherein the light guide unit comprises a light shielding plate through which the apertures extend, the light shielding plate being planar.

12. The imaging device of claim 1, wherein the light guide unit comprises a light shielding plate through which the apertures extend, the light shielding plate being curved in cross-section.

13. The imaging device of claim 12, wherein the light shielding plate is concave and protrudes toward the photoelectric conversion portion.

14. The imaging device of claim 12, wherein the light shielding plate is convex and protrudes away from the photoelectric conversion portion.

* * * * *